United States Patent

Gänzle

[11] Patent Number: 5,538,041
[45] Date of Patent: Jul. 23, 1996

[54] SANITARY SINGLE-LEVER MIXER VALVE

[75] Inventor: Fritz Gänzle, Stuttgart, Germany

[73] Assignee: Hansa Metallwerke AG, Stuttgart, Germany

[21] Appl. No.: 401,401

[22] Filed: Sep. 9, 1994

[30] Foreign Application Priority Data

Sep. 9, 1993 [DE] Germany ............... 43 30 535.0

[51] Int. Cl.$^6$ ............... F16K 35/04; F16K 11/074
[52] U.S. Cl. ............... 137/625.17; 137/625.4; 251/288; 251/297
[58] Field of Search ............... 137/625.17, 625.4; 251/288, 297

[56] References Cited

U.S. PATENT DOCUMENTS

| | | | |
|---|---|---|---|
| 3,626,479 | 12/1971 | Hammon | 251/288 |
| 4,708,172 | 11/1987 | Riis | 137/625.4 X |
| 4,733,688 | 3/1988 | Lorch | 137/624.4 X |
| 5,082,023 | 1/1992 | D'Alayer De Costemore D'Arc | 137/625.4 X |

FOREIGN PATENT DOCUMENTS 3822217  1/1990  Germany .

Primary Examiner—John Rivell
Attorney, Agent, or Firm—Lowe, Price, LeBlanc & Becker

[57] ABSTRACT

In a sanitary single-lever mixer valve, the linear displacement of a movable plate cam, which can carry out a combined rotary and linear movement upon a fixed plate cam arranged in a housing, is influenced by an elastic locking device. This acts in the region of two co-operating guide surfaces, of which one is provided on an element rotatably guided in the housing and the other is provided on the movable plate cam. A first opening is provided in a first of these guide surfaces. A second opening is provided in the second of these guide surfaces, has an approximately circular cross section, is intersected by the guide surface and receives a spring element. The latter is constructed as an incompletely closed hollow moulded element which attempts to expand elastically within the opening and therefore always projects as far as possible beyond the associated guide surface. However, the spring element can be forced completely into the accommodating opening under elastic compression.

5 Claims, 1 Drawing Sheet

SANITARY SINGLE-LEVER MIXER VALVE

BACKGROUND OF THE INVENTION

The invention relates to a sanitary single-lever mixer valve which can be used to control the mix of fluids and the volume of fluid supplied, and which includes a locking device to define an intermediate position of the valve between its fully closed and fully open positions. Such valves can be opened to the intermediate position during normal operation. Full output can nevertheless be obtained after overcoming the tangible resistance provided by the locking device.

A sanitary single-lever mixer valve of the above type is disclosed in DE-A-3822217. The locking device in the valve comprises openings on a pair of abutting guide surfaces and a spring element located in one of the openings, which is also received in the other opening when the openings are aligned. The spring element is deformed resiliently when the openings are not aligned. The spring element is essentially Z-shaped and is located in a correspondingly Z-shaped groove. It projects with a rounded nose beyond the guide surface into the opening in a movable plate cam co-operating with the guide surface in which the Z-shaped groove is formed. Corresponding spaces between the spring element and the groove which accommodates it ensure that the spring element can be elastically deformed. However, there is a danger of the spring element becoming worn relatively quickly during use of the valve. The same applies to another embodiment of the spring element that is disclosed in the document, which is elastically clamped in an approximate V-shape into the corresponding opening, so that an outwardly curved region rests with elastic force against the adjacent guide surface of the movable plate cam.

SUMMARY OF THE INVENTION

The present invention seeks to provides a sanitary single-lever mixer valve of the above type in which the spring element is provided by an incompletely closed hollow moulded element.

Accordingly, the invention provides a sanitary single-lever mixer valve which comprises:

a) a housing;

b) a first stationary place cam, which is arranged in the housing and includes inlet ports for cold and hot water;

c) a second movable plate cam which can execute a combined linear and rotary movement relative to the first plate cam, and comprises an opening which, depending on the relative position of the two plate cams, can produce a connection for fluid flow between the inlet ports of the stationary plate cam and an outlet port, the movable plate cam having parallel guide surfaces;

d) an adjusting shaft, which has a driving connection with the movable plate cam and which (i) produce the rotary movement of the movable plate cam when rotated about the axis of the housing, and (ii) produces the linear movement of the movable plate cam when pivoted about an axis lying perpendicular to the axis of the housing;

e) an element which is rotatably guided in the housing in which the adjusting shaft is mounted, and which comprises parallel guide surfaces which co-operate with the parallel guide surfaces on the movable plate cam;

f) an elastic locking device which causes a resistance, which can be overcome, to further displacement of the movable plate cam independently of its rotational position, once a given position in the movement has been reached, the locking device comprising:

(i) a first opening in a guide surface on one of the movable plate cam and the element, (ii) a second opening in an adjacent guide surface on the other of the movable plate cam and the element, the second opening being approximately circular in cross-section and intersected by the second guide surface in such a manner that it forms a slot at its opening on the guide surface, and (iii) a spring element located in the second opening, the spring element being received in the first opening when the first and second openings are adjacent to one another, and being elastically deformed in other relative positions of the guide surfaces, the spring element being an incompletely closed hollow moulded element which can be compressed elastically from a configuration in which it projects from the slot to one in which it is located substantially within the slot.

In the design of the locking device according to the invention, both a reciprocating movement of the spring element and an elastic deformation are affected by the co-operation of the cross-sectional contour of the accommodating opening and the outer contour of the spring element. During the inwardly directed movement of the spring element, the free edges of the incompletely closed hollow moulded element are brought closer together, giving rise to some elastic deformation. In contrast, elastic expansion is always associated with an outwardly directed movement of the spring element. Thus, in contrast to known valves, the spring element is not exclusively elastically deformed when it is forced back into its opening, but is also displaced as a whole. Consequently, the mechanical stressing of the spring element according to the invention is less than in known valves.

Furthermore, a relatively large amount of wearing material is provided in the spring element, which therefore only wears relatively slowly and can be very easily assembled.

In a particularly preferred embodiment, the cross-section of the spring element has the shape of a circular ring segment, that is, the spring element is a hollow cylinder which is slotted on one side.

Preferably, the second opening comprises a rib in the region remote from the second guide surface. This rib can be used to define roughly the rotary position of the spring element in the second opening by engaging between the free edges of the hollow moulded element. However, there should be a certain degree of clearance between the free edges of the moulded element and the rib in order to allow for the movement of the spring element within the associated second opening.

It is particularly preferred, for example for optimum movement guidance of the movable plate cam, that two identical locking devices are provided, arranged on opposite sides of the movable plate cam, each with a first opening in a first guide surface, a second opening in a second guide surface co-operating with the first guide surface, and a spring element, which is arranged in the second opening and is constructed as an incompletely closed hollow moulded element.

Since more space is available in the rotatably guided element, which will generally have a circular cross-section, than in the movable plate cam, it is generally recommended to provide the second opening receiving the spring element in the rotatably guided element.

INTRODUCTION TO THE DRAWINGS

DESCRIPTION OF PREFERRED EMBODIMENTS

Figure 1:
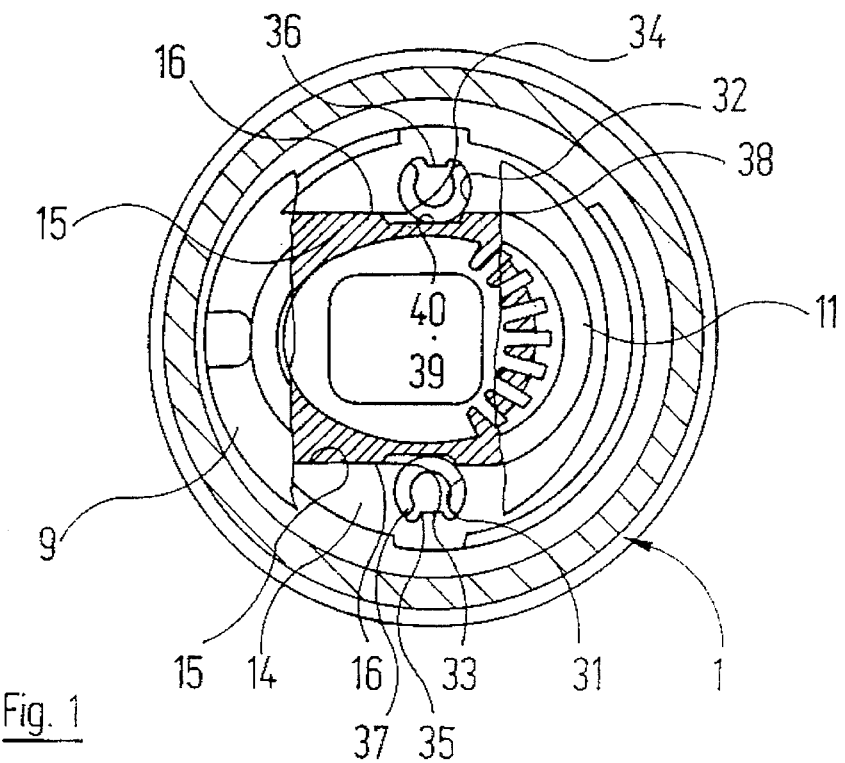
FIG. 1 is a horizontal section through a sanitary single-lever mixer valve.
Figure 2:
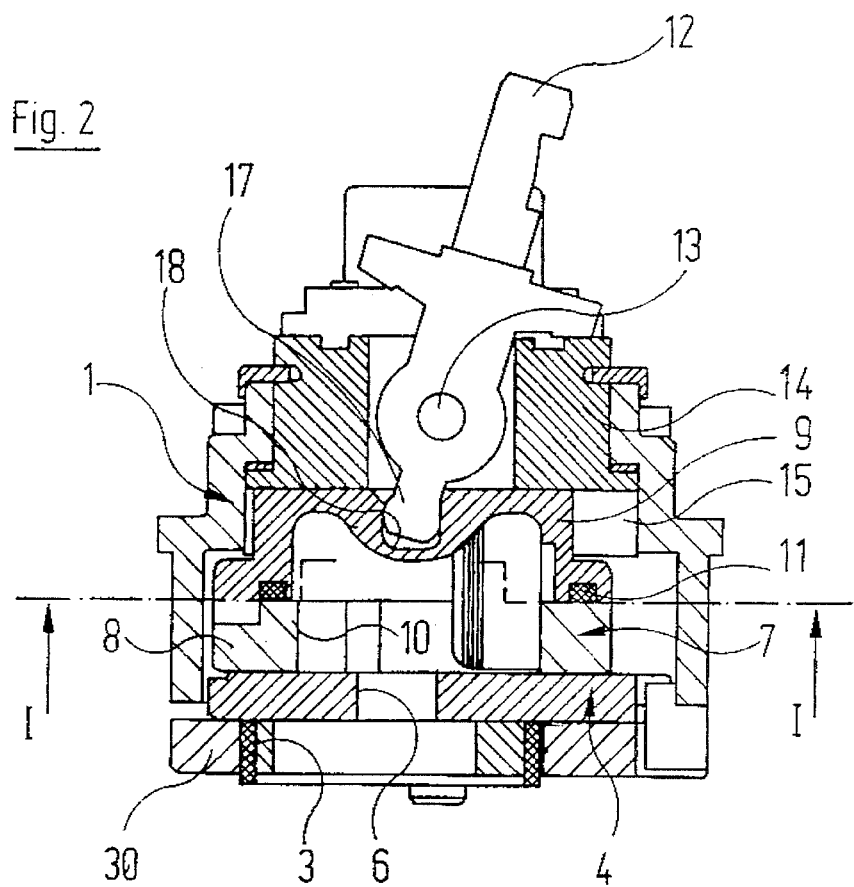
FIG. 2 is an axial section through the sanitary single-lever mixer valve of FIG. 1, on which the section line I—I for the horizontal section of FIG. 1 is shown.

A sanitary single-lever mixer valve comprises a housing 1 with a base 30, which is constructed in this case as a separate part. Two inlet ports (not visible in the drawing) and an outlet port 3 are provided in the base 30. Within the housing 1 above the base 30 a first, fixed plate cam 4 is disposed, which also comprises inlet ports (not visible in the drawing) and an outlet port 6. The inlet ports of the fixed plate cam 4 are connected to the inlet ports in the base 30 of the housing 1 and the outlet port 6 of the fixed plate cam 4 is connected to the outlet port 3 in the base 30 of the housing 1.

The fixed plate cam 4 is highly polished on its upper surface. Here, the fixed plate cam 4 rests against a downwardly facing, correspondingly machined surface of a second, movable plate cam 7. In the illustrated embodiment, the movable plate cam 7 is constructed in two parts: In its lower region adjacent the fixed plate cam 4, the movable plate cam 7 comprises a ceramic disc 8, which also comprises the above-mentioned polished surface. A plastics material guide element 9 is fitted with suitable positive locking onto the ceramic disc 8 in such a manner that the plastics material guide element 9 and the ceramic disc 8 can be regarded as a unit, i.e. the movable plate cam 7.

A reversing duct 10 is formed in the movable plate cam 7, namely partially in the ceramic disc 8 and partially in the plastics material guide element 9. Depending on the relative position of the movable plate cam 7 and the fixed plate cam 4, the reversing duct 10 forms a connection between the inlet ports and the outlet port 6 of the fixed plate cam 4. Thus, both the mixing ratio and the quantity of outflowing mixed water can be adjusted in known manner by a displacement of the movable plate cam 7.

An O-ring 11 between the plastics material guide element 9 and the ceramic disc 8 ensures that no water can escape radially outwards from the reversing duct 10.

The combined linear and rotary movement of the movable plate cam 7 is effected by means of an adjusting shaft 12, on which a handle is fitted during final assembly. The adjusting shaft 12 is mounted by means of a journal 13 on a rotatably guided element 14, which is arranged coaxial to the housing 1 and projects through an upper opening from the housing 1. From below, a groove with two parallel guide surfaces 15 (see FIG. 1) is formed in the rotatably guided element 14. The plastics material guide element 9 of the movable plate cam 7 in turn comprises a projection with two parallel guide surfaces 16 matching the groove, the parallel guide surfaces 16 cooperating with the parallel guide surfaces 15 of the rotatably guided element 14. The arrangement is therefore such that the movable plate cam 7 can be radially displaced along the parallel guide surfaces 15 of the rotatably guided element 14 or can be pivoted together with the rotatably guided element 14 about the axis of the housing 1.

A driving head 17 is moulded onto the lower end of the adjusting shaft 12 and engages in a positive-locking manner into a driving opening 18 in the upwardly facing surface of the plastics material guide element 9.

The design of the sanitary single-lever mixer valve described thus far is known, as is its basic function:

By pivoting the adjusting shaft 12 about the journal 13, the movable plate cam 7 moves along the guide surfaces 15, 16; as a result it is possible to adjust the quantity of water flowing in through the inlet ports of the fixed plate cam 4, ideally without having to change the mixing ratio. In contrast, when the adjusting shaft 12 is rotated about the vertical axis of the housing 1, the rotatably guide element 14 also rotates. The movable plate cam 7 is driven via the guide surfaces 15, 16, which leads in known manner to a change in the mixing ratio of the mixed water flowing out through the outlet port 6 of the fixed plate cam 4. Ideally, the quantity of mixed water remains unchanged in this case.

So that it is unnecessary to limit the maximum output of the sanitary single-lever mixer valve on the one hand, and in order to encourage an economical use of water on the other hand, a special device is provided, which blocks the displacement of the movable plate cam 7 in a definite manner once a given degree of opening is reached. This device is explained in further detail in the following:

Two openings 31, 32, the "basic shape" of which is cylindrical and which are therefore approximately circular in cross-section, as shown in FIG. 1, are provided in the rotatably guided element 14. The openings 31, 32 are intersected by the guide surfaces 15 in the rotatably guided element 14 in such a manner that they open in each case into the guide surfaces 15 with slots 33, 34 extending parallel to the axis of the single-lever mixer valve. As a result of axially parallel ribs 35, 36, which extend in the region of the openings 31, 32 remote from the guide surfaces 15, the openings 31, 32 receive a cross-section which deviates somewhat from the circular form.

A spring element 37, 38 is introduced from below into each of the openings 31, 32 of the rotatably guided element 14. The spring elements 37, 38 have a cross-section in the shape of a circular ring segment, which extends through an angle of more than 180°. The spring elements 37, 38 are made of elastic material, preferably an elastic plastics material; the outer diameter of the tension-free spring elements 37, 38 is somewhat greater than the diameter of the openings 31, 32. The spring elements 37, 38 are therefore fitted into the openings 31, 32 with slight elastic pre-tension, so that the spring elements attempt to expand—as a result of their elasticity—and thus rest with elastic pre-tension against the inner cylindrical surface of the openings 31, 32. The ends of the ring segment, which each spring element 37, 38 forms in cross-section, are disposed at a given distance from the lateral surfaces of the ribs 35, 36.

Flat openings 39, 40, which also extend axially parallel, are provided at corresponding places in the guide surfaces 16 of the plastics material guide element 9. If the openings 39, 40 are arranged opposite the spring elements 37, 38, as shown in FIG. 1, then the spring elements project through the slots 33, 34 formed in the guide surfaces 15 into the openings 39, 40 in the plastics material guide element 9.

In contrast, if the movable plate cam 7, i.e. including the plastics material guide element 9, is displaced relative to the position shown in FIG. 1, then each spring element 37, 38 travels over a slightly upwardly inclined ramp of the openings 39, 40 into the region of the guide surfaces 16 of the plastics material guide element 9 and in so doing is pushed into the openings 31, 32 in the rotatably guided element 14. With a further elastic deformation of the spring elements 37, 38, the ends of the circular ring segments, formed by the spring elements 37, 38 in cross-section, approach the ribs 35, 36 and therefore also approach one another, whilst the hitherto projecting region of the spring elements 37, 38 is simultaneously forced completely into the openings 31, 32.

The method of operation of the described arrangement is as follows:

In the closed position of the valve shown in FIG. 1, the spring elements 37, 38 are disposed in the region of the right-hand ends of the openings 39, 40 of the plastics material guide element 9. If the plastics material guide element 9 is displaced to the right in FIG. 1, i.e. in the direction of opening, by pivoting the adjusting shaft 12, then the plastics material guide element 9 firstly slides easily in the rotatably guided element 14, since the regions of the spring elements 37, 38 projecting from the openings 31, 32 move within the openings 39, 40 of the plastics material guide element 9. However, when the projecting regions of the spring elements 37, 38 reach the ramp forming the left-hand end of the openings 39, 40 as a result of the further movement of the movable plate cam 7, then the further linear movement of the movable plate cam 7 to the right in FIG. 1 is impeded. Only by overcoming the elastic force, which is necessary for forcing the spring elements 37, 38 back into the openings 31, 32 in the rotatably guided element 14, it is possible to move the movable plate cam 7 further in the direction of opening.

The tangible resistance generated when the spring elements 37, 38 contact the transition ramps of the openings 39, 40 on the left in FIG. 1 means that the sanitary mixer valve only opens as far as this position during normal operation. Consequently, only a given, usually sufficient quantity of mixed water flows. However, when more water is required, it is possible to produce a further opening of the sanitary single-lever mixer valve by overcoming the resistance generated by the spring elements 37, 38.

What is claimed is:

1. A sanitary single-lever mixer valve which comprises:
   a) a housing;
   b) a first stationary plate cam, which is arranged in the housing and includes inlet ports for cold and hot water;
   c) a second movable plate cam which can execute a combined linear and rotary movement relative to the first plate cam, and comprises an opening which, depending on the relative position of the two plate cams, can produce a connection for fluid flow between the inlet ports of the stationary plate cam and an outlet port, the movable plate cam having parallel guide surfaces;
   d) an adjusting shaft, which has a driving connection with the movable plate cam and which (i) produces the rotary movement of the movable plate cam when rotated about the axis of the housing, and (ii) produces the linear movement of the movable plate cam when pivoted about an axis lying perpendicular to the axis of the housing;
   e) an element which is rotatably guided in the housing in which the adjusting shaft is mounted, and which comprises parallel guide surfaces which co-operate with the parallel guide surfaces on the movable plate cam;
   f) an elastic locking device which causes a resistance, which can be overcome, to further displacement of the movable plate cam independently of its rotational position, once a given position in the movement has been reached, the locking device comprising:
      (i) a first opening in a guide surface on one of the movable plate cam and the element,
      (ii) a second opening in an adjacent guide surface on the other of the movable plate cam and the element, the second opening being approximately circular in cross-section and intersected by the second guide surface in such a manner that it forms a slot at its opening on the guide surface, and
      (iii) a spring element located in the second opening, the spring element being received in the first opening when the first and second openings are adjacent to one another, and being elastically deformed in other relative positions of the guide surfaces, the spring element being an incompletely closed hollow moulded element which can be compressed elastically from a configuration in which it projects from the slot to one in which it is located substantially within the slot.

2. A sanitary single-lever mixer valve according to claim 1, in which the spring element has a cross-section in the shape of a circular ring segment.

3. A sanitary single-lever mixer valve according to claim 1, in which the second opening comprises a rib in the region remote from the second guide surface.

4. A sanitary single-lever mixer valve as claimed in claim 1, in which two identical locking devices are provided on opposite sides of the movable plate cam, each having a first opening in a first guide surface, a second opening in a second guide surface co-operating with the first guide surface, and a spring element, which is arranged in the second opening and is constructed as an incompletely closed hollow moulded element.

5. A sanitary single-lever mixer valve as claimed in claim 1, in which the second opening accommodating the spring element is formed in the rotatably guided element.

* * * * *